(12) United States Patent
Huditz et al.

(10) Patent No.: US 8,967,735 B2
(45) Date of Patent: Mar. 3, 2015

(54) ELECTROHYDRAULIC POWER UNIT

(75) Inventors: Andreas Huditz, Immenstadt (DE);
Uwe Kaechele, St. Johan-Wuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 13/997,282

(22) PCT Filed: Dec. 20, 2011

(86) PCT No.: PCT/EP2011/073320
§ 371 (c)(1),
(2), (4) Date: Jun. 24, 2013

(87) PCT Pub. No.: WO2012/084882
PCT Pub. Date: Jun. 28, 2012

(65) Prior Publication Data
US 2013/0278049 A1    Oct. 24, 2013

(30) Foreign Application Priority Data
Dec. 22, 2010    (DE) .......................... 10 2010 063 855

(51) Int. Cl.
*B60T 8/36* (2006.01)
*B60T 13/20* (2006.01)

(52) U.S. Cl.
CPC *B60T 13/20* (2013.01); *B60T 8/368* (2013.01)
USPC ....................................... 303/119.3; 439/675

(58) Field of Classification Search
USPC ...................... 303/119.3, 11, 119.2, DIG. 10; 417/410.1, 423.1; 439/76.1, 675, 744, 439/746
See application file for complete search history.

(56) References Cited

U.S. PATENT DOCUMENTS

| 6,011,341 | A | 1/2000 | Toya et al. | |
| 6,059,381 | A * | 5/2000 | Bayer | 303/119.3 |
| 6,241,489 | B1 | 6/2001 | Lewin et al. | |
| 6,550,873 | B1 * | 4/2003 | Hengler et al. | 303/119.3 |
| 7,354,117 | B2 * | 4/2008 | Otsuka et al. | 303/116.4 |

(Continued)

FOREIGN PATENT DOCUMENTS

| DE | 19949221 | 4/2001 |
| EP | 1586491 | 10/2005 |

(Continued)

OTHER PUBLICATIONS

International Search Report for Application No. PCT/EP2011/073320 dated Mar. 13, 2012 (3 pages).

*Primary Examiner* — Pamela Rodriguez
(74) *Attorney, Agent, or Firm* — Michael Best & Friedrich LLP

(57) ABSTRACT

An electrohydraulic power unit for controlling, by open or closed loop, a brake pressure of a hydraulic vehicle brake system, includes a hydraulic block, on which an electric motor for driving a hydraulic pump is provided, an electronic control device, and at least one electrical contact, which electrically conductively connects the electric motor to the electronic control device. The electrical contact is accommodated in a rod-shaped isolator that together with the electrical contact is guided through a through-passage in the hydraulic block extending from the side of the hydraulic block on which the control device is provided to the side of the hydraulic block on which the electric motor is provided. The rod-shaped isolator is designed as a housing in which the electrical contact can be inserted and secured substantially with zero backlash and non-detachably.

7 Claims, 4 Drawing Sheets

(56) References Cited

U.S. PATENT DOCUMENTS

2003/0090147 A1\* 5/2003 Risch et al. ........... 303/119.3
2005/0207914 A1\* 9/2005 Tupy ..................... 417/410.1

FOREIGN PATENT DOCUMENTS

WO  0185511  11/2001
WO  02057124  7/2002

\* cited by examiner

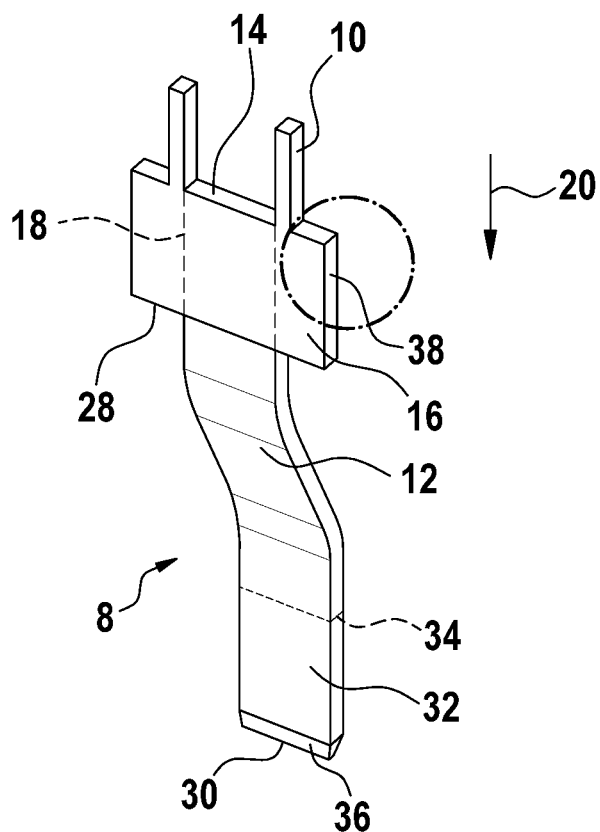
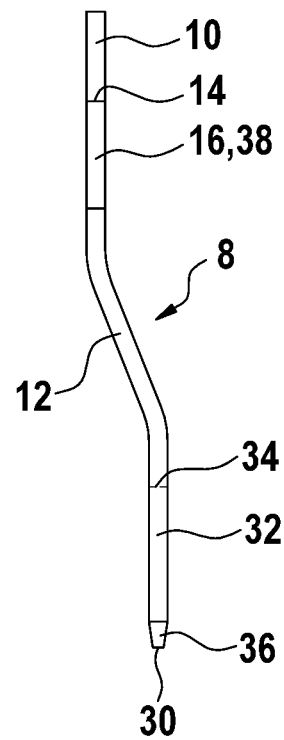
Fig. 3    Fig. 4
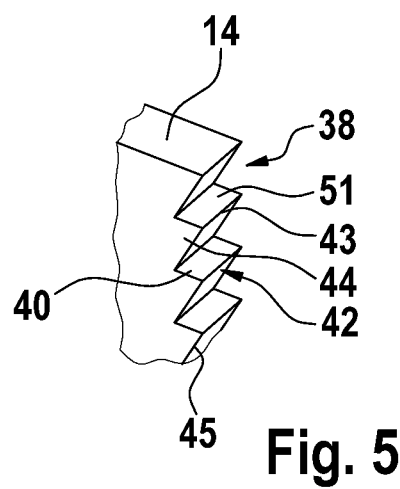
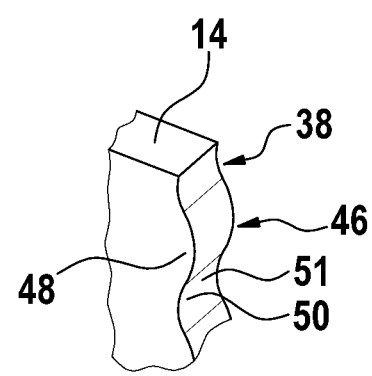
Fig. 5    Fig. 6

ELECTROHYDRAULIC POWER UNIT

BACKGROUND OF THE INVENTION

The present invention relates to an electrohydraulic power unit for controlling, by open or closed loop, a brake pressure of a hydraulic vehicle brake system.

Such power units are used for wheel-slip brake control (ABS/Antilock Brake System), for anti-slip regulation (ASR), for electronic vehicle dynamics control (ESP/Electronic Stability Program) and the like. Such a power unit is known, for example, from the German patent application DE 199 49 221 A1. The known power unit comprises a hydraulic block, in which, besides other hydraulic components such as magnetic valves, a hydraulic pump is accommodated that is driven by an electric motor. An electronic control device, which has at least one blade contact for electrically connecting the electric motor to said electronic control device, is provided on the side of the hydraulic block opposite the electric motor. The at least one blade contact is thereby extrusion coated with plastic.

SUMMARY OF THE INVENTION

It can be considered a requirement to connect the electrical contacts, which connect the electric motor to the electronic control device, to said electric motor and said electronic control device only when positioning the electronic control device.

An electrohydraulic power unit for controlling, by open or closed loop, a brake pressure of a hydraulic vehicle brake system comprises a hydraulic block, which has a hydraulic pump and on which an electric motor for driving the hydraulic pump is provided, an electronic control device, which is provided on a side of the hydraulic block opposite the electric motor, and at least one electrical contact, which electrically conductively connects the electric motor to the electronic control device. The electrical contact is accommodated in a rod-shaped isolator. The rod-shaped isolator, together with the electrical contact accommodated therein, is guided through a through-passage in the hydraulic block, said through passage extending through the hydraulic block from the side of said hydraulic block on which the control device is provided to the side of said hydraulic block on which the electric motor is provided. In so doing, the rod-shaped isolator is designed as a housing in which the electrical contact can be inserted and secured substantially with zero backlash and non-detachably.

As a result of inserting an electrical contact into a housing, it is possible to electrically conductively connect the electronic control device to the at least one electrical contact only after said contact has been fitted. Such electrical contacts bridge as a rule a distance of several centimeters between the electronic control device and the electric motor. It can therefore be considered an advantage of the invention that the contacts, which protrude far out of the electronic control device, are not also fitted during the manufacture of said electronic control device. If only connected to said electronic control device and not otherwise secured, such extensively protruding electrical contacts can be bent more easily than those electrical plug contacts which are only embodied short in length.

It can be seen as a further advantage of the invention that the electrical contact is inserted in the housing substantially with zero backlash. Substantially with zero backlash means in this case that the electrical contact can move approximately 0.1 mm transversely to the insertion direction thereof in the region, which the mating contact of the electric motor comprises. This facilitates, especially in the case of an automated manufacturing process in which the individual components or assemblies are unvaryingly positioned, the electrical contact of the electronic control unit finding the corresponding mating contact of the electric motor without difficulty. It can furthermore be seen as advantageous that the electrical contact is non-detachably connected to the housing. In this way, the electrical contact can be connected to the mating contact of the electric motor under the impact of force without said force being transferred to the electronic control device.

In a further exemplary embodiment of the invention, the electronic control unit comprises a tray, wherein the tray and the housing are embodied as one piece.

It is therefore now possible to place the tray of the control device including the housing, which is equipped with an electrical contact and extends away from control electronics that are to be fitted, on the part of the hydraulic block that receives the electric motor as well as on the magnetic valves, which have been preinstalled there. The control electronics can subsequently now be positioned and be electrically conductively connected to the at least one electrical contact as well as to the electrical contacts of the magnetic valves.

In a further exemplary embodiment of the invention, the electrical contact is embodied as a blade contact or pin contact, comprising a contact dome, a contact enlargement and a contact piece. The contact enlargement is thereby configured at a first end of the contact dome transversely to a direction of longitudinal extension of said contact dome. The contact piece is configured at a second end of the contact dome, which is opposite the first end, in the direction of longitudinal extension of said contact dome.

Two enlargements are preferably configured at the contact dome. The shape of the enlargement is generally rectangular. The enlargement further comprises a terminal lug which is electrically conductively connected to the control electronics. The electrical contact can be designed symmetrically with respect to a center axis by means of the two enlargements. Furthermore, the electrical contact is generally manufactured from sheet metal. The enlargement does not necessarily have to run in the same plane as the contact dome but can be angled with respect to said contact dome. The pin contact differs from the blade contact to the extent that said pin contact has a square or circular cross-section at least in the region of the contact piece. In contrast thereto, the blade contact has a rectangular cross-section at least in the region of the contact piece, wherein the broadside is generally many times larger than the narrow side.

In a further exemplary embodiment of the invention, a narrow side of the contact enlargement running in the direction of longitudinal extension of the contact dome is configured as a pine-tree profile or a wave profile.

When pressing electrical contacts, which are configured in such a manner, into pockets in a plastic housing, which are correspondingly provided for this purpose, the pine-tree profiles or wave profiles elastically and/or plastically deform. Due to the fact that the plastics flow, at least a part of the plastic displaced through the profiles gets into the cavities created between the profile and the housing. Thus without destroying the electrical contact or the housing, a non-detachable connection between this very electrical contact and the associated housing is achieved. The pine-tree profile differs from the wave profile in that, instead of a wave, a notch is formed in such a manner that the inclined plane thereof faces the contact piece of the electrical contact. Depending upon the type of plastic material, particularly upon the modulus of elasticity and/or the flow properties thereof, the use of the wave profile can be more suitable than that of the pine-tree profile.

In a further exemplary embodiment of the invention, the contact dome is bent in an S-shaped manner such that the contact dome in the region of the contact enlargement and the contact dome in the region of the contact piece extend parallel to each other.

By an S-shaped bend, it is not only to be understood that round corners are created by the bends but rather the S-shaped bend can also be configured having sharp edges or can result from, as a rule, abutted joining of a plurality of individual parts. The S-shaped bend is also not limited to being carried out in one plane. In fact, a first bend can, for example, be carried out in a first plane and a second bend in a second plane, which is, for example, perpendicular to the first plane. The offset of the contact enlargement and the contact piece amounts to 0.2 mm in the example presented here. The offset can, however, assume every other value from approximately 0.1 mm to approximately 1 mm. Such pre-bent electrical contacts can then be used if the use of straight electrical contacts would prevent a connection with the mating plug from being made during assembly or if connection is made with the mating plug but a reduced creep rupture strength of the plug, the mating plug and/or the printed circuit boards fitted with said plugs would result due to the voltages applied to said mating plug. Such imperfections can occur if, for example, a redesign was carried out with two printed circuit boards, which are operated with each other using a piggy back procedure and are electrically connected to each other by means of said contacts, but only one of the printed circuit boards finds it way into production because a sufficient inventory of the other printed circuit board is still present which has to be used up. Such an offset can also occur if commercially available printed circuit boards are connected to printed circuit boards produced in-house, wherein the commercially available printed circuit boards are resolved in a different grid system than the printed circuit boards produced in-house.

In a further embodiment of the invention, the housing comprises in the direction of longitudinal direction thereof an insertion region at a first end, wherein the insertion region has a pocket and a recess. The pocket has surfaces such that the contact enlargement can be received with zero backlash in a predetermined position. In this connection, the recess is designed in such a manner that the contact dome can be inserted into the housing free of any bending or torsional force, and the contact dome is guided free of any bending or torsional force after assuming the predetermined position.

As a result of the rectangular deformation of the enlargement and the pocket, the electrical contact can be inserted into the housing up until a surface of the pocket, namely the base surface, prevents a further insertion of the intermediate contact. The electrical contact has thus assumed a predetermined position. In order to achieve this advantage, the pocket and contact enlargement do not necessarily have to be of rectangular design but can, for example, also be of conical design. As already indicated above, a connection having at least substantially zero backlash is created by an interaction of the narrow side, which is designed in a pine tree-like or wave-like fashion, and the adjoining surfaces of the contact enlargement in conjunction with the surfaces of the pocket. The housing can fix, in the insertion region thereof, the electrical contact exclusively at the contact enlargement. Thus, the housing can be recessed in the region of the contact dome. Especially the fact that the electrical contact is accomodated in the housing in a manner free of any bending and torsional force has the effect that said housing does not generate any tensions in the contact and vice versa. This promotes the creep rupture strength of the contact as well as the housing, especially when taking into account that said housing as well as said contact is constantly exposed to high temperature fluctuations and vibrations due to the use thereof in the engine compartment of an automobile or truck.

In a further configuration of the invention, the housing comprises an outlet region in the direction of longitudinal extension at a second end which is opposite the first end. The outlet region is narrowed by a wedge at least on one side such that an inserted electrical contact is guided substantially with zero backlash transversely to the direction of longitudinal extension of the electrical contact.

This wedge can be formed only on one side or also on two opposing sides in the outlet region. The wedge can also be configured on each of two abutting sides. Said wedge is formed in such a manner that it facilitates the feedthrough of the electrical contact through the housing. When the electrical contact leaves the outlet region of the housing, said wedge limits the freedom of movement of said electrical contact transversely to the direction of extension thereof such that the contact piece of the electrical contact either has zero backlash or the end thereof facing the mating plug has a backlash of approximately 0.1 mm.

In a further exemplary embodiment of the invention, a first and a second bent electrical contact are accommodated in a common housing, wherein the first ends of the first and the second contact domes are arranged in the insertion region and are spaced apart from one another by a first distance. The second ends of the first and the second contact dome are arranged in the outlet region and are spaced apart from one another by a second distance. The spacing is carried out in such a manner that the second distance is smaller than the first distance.

In this exemplary embodiment, two equally shaped electrical contacts are inserted into a common housing such that the S-shaped deflections of the contacts are opposite one another. In the exemplary embodiment described here, the first distance is reduced from, for example, 5.0 mm to a second distance of 4.6 mm. Differences between the first distance and the second distance, which lie in the millimeter range, can of course be produced by deflections of the electrical contacts which are selected differently as well as by appropriate positioning in differently shaped housings. Plug and housing can also be designed such that the second distance is greater than the first distance.

In a further exemplary embodiment of the invention, the recess of the first contact dome and the recess of the second contact dome, which faces the recess of the first contact dome, are connected to one another and form a common recess, wherein the common recess extends up to the wedge.

In so doing, accumulations of material are advantageously prevented in the housing. This is particularly advantageous if the housing is manufactured in a plastic injection molding process. Identical wall thicknesses can lead to a higher degree of dimensional stability of the injection molded part.

The embodiments up until now related to the fact that the housing accommodating the electrical contacts is manufactured from a non-conductive plastic. Of course, the housing can also be produced from an electrically conductive material. The electrical contacts can then be provided in an electrically non-conductive manner in the regions, in which said contacts touch the housing. This electrical non-conductibility could, for example, be produced by coating said contacts with, for example, plastic.

In the description up until now, it was assumed that an electrical contact pre-bent in an S-shaped manner is accommodated in a correspondingly designed housing. It would of course also be possible to introduce a planar, i.e. not already pre-bent, electrical contact into a housing, wherein the housing pretensions the fitted electrical contact in an S-shaped manner.

Further details and advantages of the invention ensue from the dependent claims in combination with the description of exemplary embodiments, which are explained in more detail with the aid of the drawings.

It should be noted that the inventive ideas herein are described in relation to an electrohydraulic power unit. It is however clear to the person skilled in the art that the individual features described can be combined with each other in various ways in order to arrive at other configurations of the invention.

BRIEF DESCRIPTION OF THE DRAWINGS

Embodiments of the invention are described below with reference to the accompanying figures. The figures are only depicted schematically and are not drawn to scale.

FIG. 3 shows a 3D-view of the electrical contact, FIG. 4 shows a side view of the electrical contact, FIG. 5 shows a section from a narrow side of a contact enlargement having a pine-tree profile, FIG. 6 shows a section from the narrow side of the contact enlargement having a wave profile.

DETAILED DESCRIPTION

Figure 1:
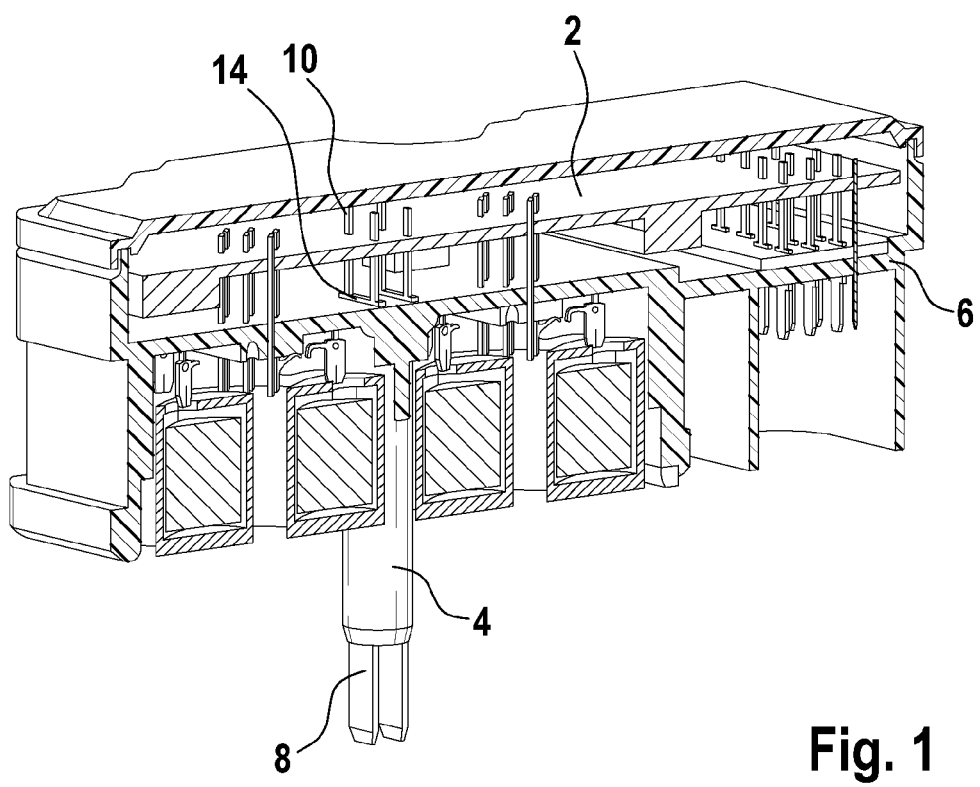
FIG. 1 shows a housing comprising two electrical contacts and control electronics in longitudinal section.

Identical or similar components in different figures are provided with the same reference numerals.

An electronic control device is depicted in FIG. 1. The electronic control device comprises control electronics 2, which are situated above a tray 6. A housing 4 is connected to and integrally embodied with the tray 6, said housing accommodating two electrical contacts 8. The electrical contact 8 has a first end 14, whereat two terminal lugs 10 are configured, which are electrically conductively connected to the control electronics 2.

Figure 2:
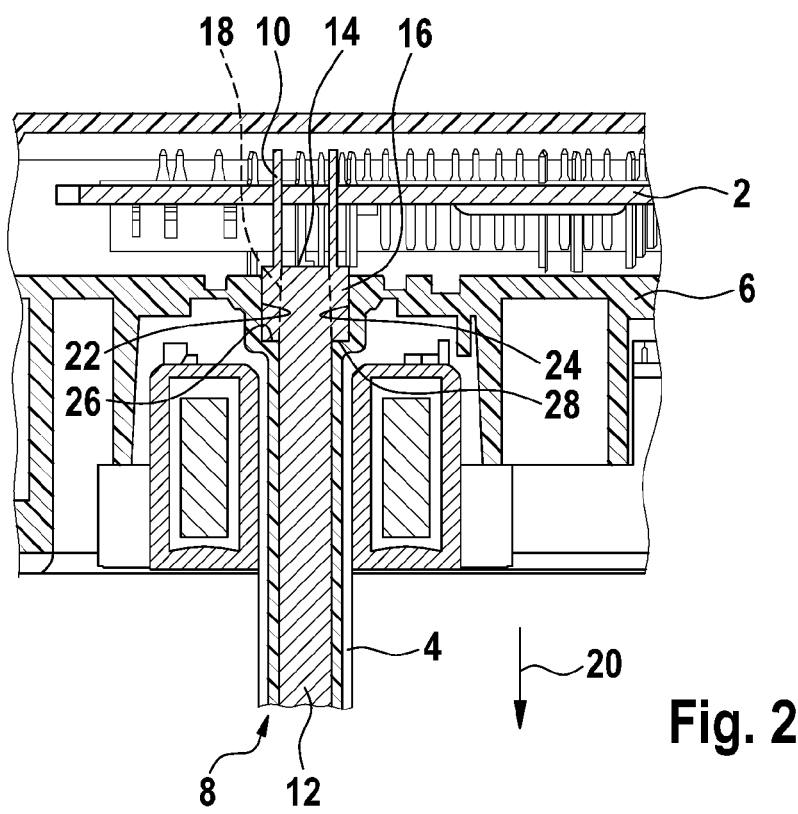
FIG. 2 shows the housing comprising an assembled electrical contact and the control electronics in longitudinal section.

FIG. 2 shows a longitudinal section through the housing 4, in which an electrical contact 8 is fitted and is electrically conductively connected to the control electronics 2 by means of two terminal lugs 10. It can be clearly seen that the electrical contact 8 is formed from a contact dome 12 and two contact enlargements 16. The contact enlargements 16 are configured at a first end 14 of the contact dome, wherein a first dashed line 18 is intended to represent an imaginary delimiting plane of the contact enlargement 16 and the contact dome 12. It can further be seen that the housing extends in a direction, which faces away from the control electronics 2. This is illustrated by an arrow 20, which is intended at the same time to depict the direction of longitudinal extension of the electrical contact 8. The contact enlargement 16 is situated in a pocket 22, which is located in a partial region of the housing 4 which faces the control electronics 2. Lateral surfaces 24 of the pocket 22 thereby fix the contact enlargement 16. The electrical contact 8 is situated in a predetermined position such that a base surface 28 of the contact enlargement 16 is in contact with a base surface 26 of the pocket 22.

FIG. 3 shows the electrical contact 8 as an individual part, which is pre-bent in an S-shaped manner. The electrical contact 8 is manufactured from sheet metal and is embodied as one piece in the entirety thereof. The S-shaped pre-bend or deflection can be seen particularly well in FIG. 4. The electrical contact 8 is depicted as a blade contact, which differs from a pin contact by means of the rectangular cross-section thereof in the region of the contact dome. The electrical contact 8 consists of the contact dome 12, which extends from the first end 14 to a second end 30. A contact enlargement 16 is integrally formed at the first end 14 on both the left and right side. In this regard, the first dashed line 18 indicates where the contact dome 12 ends and the contact enlargement 16 begins. The contact dome 12 and the two enlargements 16 are situated here in one plane. The enlargements 16 can, of course, also be designed angled towards the contact dome 12. A terminal lug 10 is integrally formed at each contact enlargement 16, the former extending in the opposite direction to the direction of longitudinal extension of the electrical contact 8, which is indicated by the arrow 20. The contact dome 12 is designed as a contact piece 32 at the second end 30 thereof. The contact piece 32 extends up to a second dashed line 34. The contact piece 32 is essentially the part of the contact dome 12 which protrudes from the housing 4 (not depicted here) and is received in a mating contact of an electric motor that is also not depicted here. Said contact piece 32 is circumferentially provided with an insertion chamfer 36 at the second end thereof, which facilitates an insertion into the mating contact.

A narrow side 38 of the contact enlargement 16 is profiled in the present exemplary embodiment. FIG. 5 shows a possible configuration of said narrow side 38. A so-called pine-tree profile 42 is depicted here. It can clearly be seen that the pine-tree profile 42 consists of a plurality of wedges 44 arranged one on top of each other. The wedge consists of a straight side 40 and an oblique side 45. In this case, the straight side 44 faces towards the first end 14 and the oblique side 45 in the direction of the second end 30, which is not depicted in said FIG. 5. A cavity is denoted as a recess 51, which is delimited from the straight 44 and oblique side 45 as well as from an imaginary plane connecting two wedge tips 43.

FIG. 6 shows a further configuration of the narrow side 38, namely as a wave profile 46. It can clearly be seen that this wave profile 46 consists of waves 48 and valleys 50. In this respect, the valley 50 represents the recess 51 vis-á-vis the wave 48. The wave profile 46 as well as the pine-tree profile 42 meet the same aim if the electrical contact 8 is fitted in the housing. When inserting the enlargements 16 into the pockets 22, which are provided for this purpose, of the housing manufactured from plastic, the two profiles 42, 46 elastically as well as plastically deform the plastic of the plastic housing 4, which comes in contact with them. As a result of the flow properties of the plastic, the displaced plastic fills cavities, which have been produced by the recesses 51. In so doing, the electrical contact 8 is non-detachably connected to the housing 4. Depending particularly on the modulus of elasticity and the flow properties of the plastic used for the housing 4, the use of the pine-tree profile 42 or the wave profile 46 can be more suitable.

Figure 7:
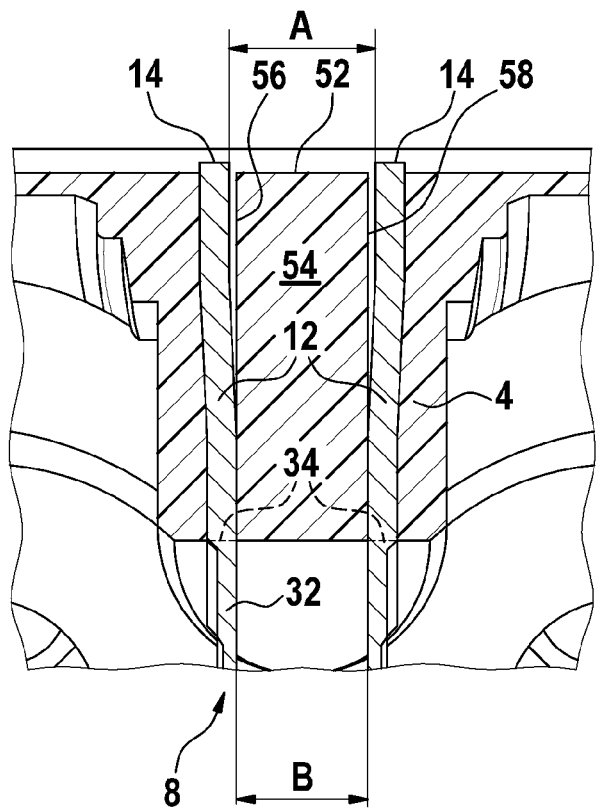
FIG. 7 shows a cross-section through the housing comprising two electrical contacts.

In FIG. 7, the interaction between two S-shaped pre-bent electrical contacts 8 is depicted in conjunction with the housing 4. The electrical contacts 8 are inserted such that the deformations of the contact dome 12 face towards each other. An insertion region 54 is designed at the first end 52 of the housing 4. In so doing, a first recess 56 associated with the electrical contact 8 depicted on the left and a second recess 58 associated with the electrical contact 8 on the right are configured in the insertion region 54. Such an arrangement of two electrical contacts 8 results in a first distance A, measured at the first end 14 between the two electrical contacts 8 differing from a second distance B, measured between the two electrical contacts 8 in the region of the contact points 32. In the exemplary embodiment presented here, the first distance A amounts to 5.0 mm and the second distance B to 4.6 mm. Each electrical contact 8 is pre-bent by 0.2 mm in the region of the contact dome thereof. The housing 4 could, of course, also be configured such that the deflections of the electrical contacts 8 are oriented in the same direction and therefore the two distances A and B are the same size. The electrical contacts 8 can also be inserted into the housing 4 such that the distance A is smaller than the distance B. The two recesses 56, 58 ensure on the one hand that the electrical contact 8 can be inserted into the housing 4 in a manner free of any bending and torsional force. On the other hand, the recesses 56, 58 ensure that the electrical contacts 4, if they have assumed their predetermined position, are guided in a manner free of any bending and torsional force. Such a configuration promises a long creep rupture strength for the housing 4 as well as for the electrical contact 8, especially if it is taken into account that the electrohydraulic power unit, in which the housing 4 as well as the electrical contact 8 is integrated, is accommodated in the engine compartment of an automobile or truck and thereby is subject to large temperature fluctuations as well as vibrations.

Figure 8:
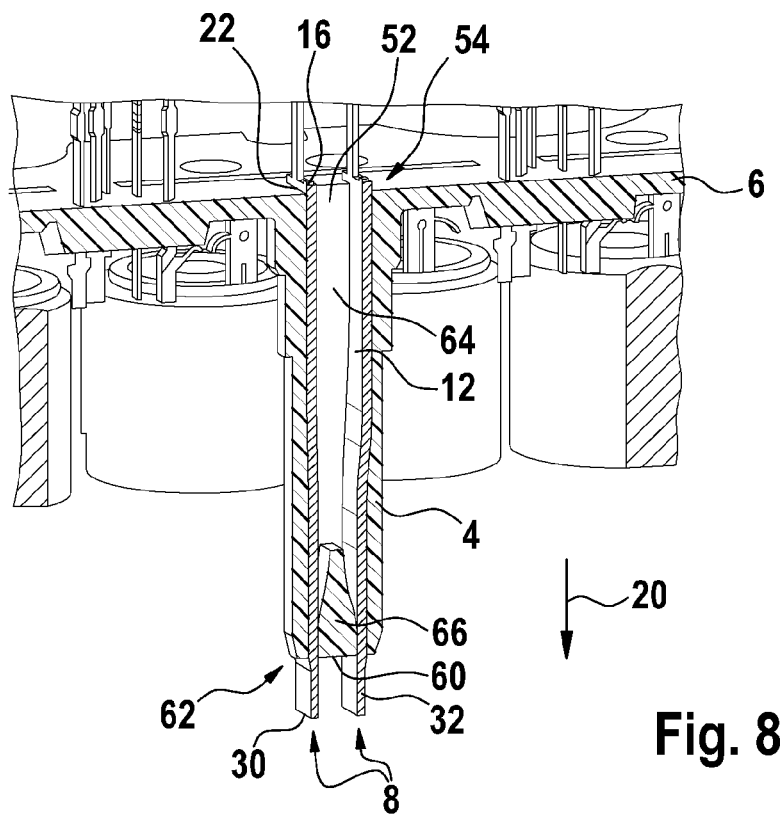
FIG. 8 shows a 3D-view of the housing comprising two fitted contacts in sectional view and FIG. 9 shows a 3D-view of the housing comprising a fitted electrical contact and an electrical contact to be inserted in sectional view.

FIG. 8 shows a further exemplary embodiment of the invention. In this case, the contact 8 as well as the housing 4 is depicted three-dimensionally in section. FIG. 8 differs essentially from the depiction in FIG. 7 in that the first 56 and the second recess 58 are connected to one another to form a common recess 64. The substantially zero backlash and non-detachable attachment of the electrical contact 8 in the insertion region 54 of the housing results in this particular exemplary embodiment by virtue of the fact that solely the contact enlargements 16 are fixed in the housing 4 by the associated pockets and not the contact dome 12. A double wedge 66 is situated in an outlet region 62 of the housing 4, which lies opposite the insertion region in the direction of longitudinal extension 20. Said double wedge 66 ensures on the one hand that the contact piece 32 can be easily guided through the housing 4; and on the other hand, said wedge 66 ensures that the electrical contact 8 has at least substantially zero backlash transversely to the direction of longitudinal extension thereof. This means that the electrical contact 8 is either completely free of backlash or has only minimal play in the range of 0.1 mm at the end 30 thereof. The common recess 64 depicted here allows for a housing design, in which accumulations of material can be prevented to a great extent in the housing 4. This can lead to an improved dimensional stability of the housing 4, in particular if said housing 4 is embodied as a plastic injection molded part. FIG. 8 also shows that the contact pieces 32 protrude out of the housing 4 in the direction of longitudinal extension 20 of the electrical contact 8. The length of the housing 4 between the first end 52 and a second end 60 amounts to approximately 30 mm. The length of the contact piece 32 protruding out of said housing 4 amounts to approximately 25 mm. The first end 14 of the contact dome 12 thereby closes flush to the first end 52 of said housing 4.

Figure 9:
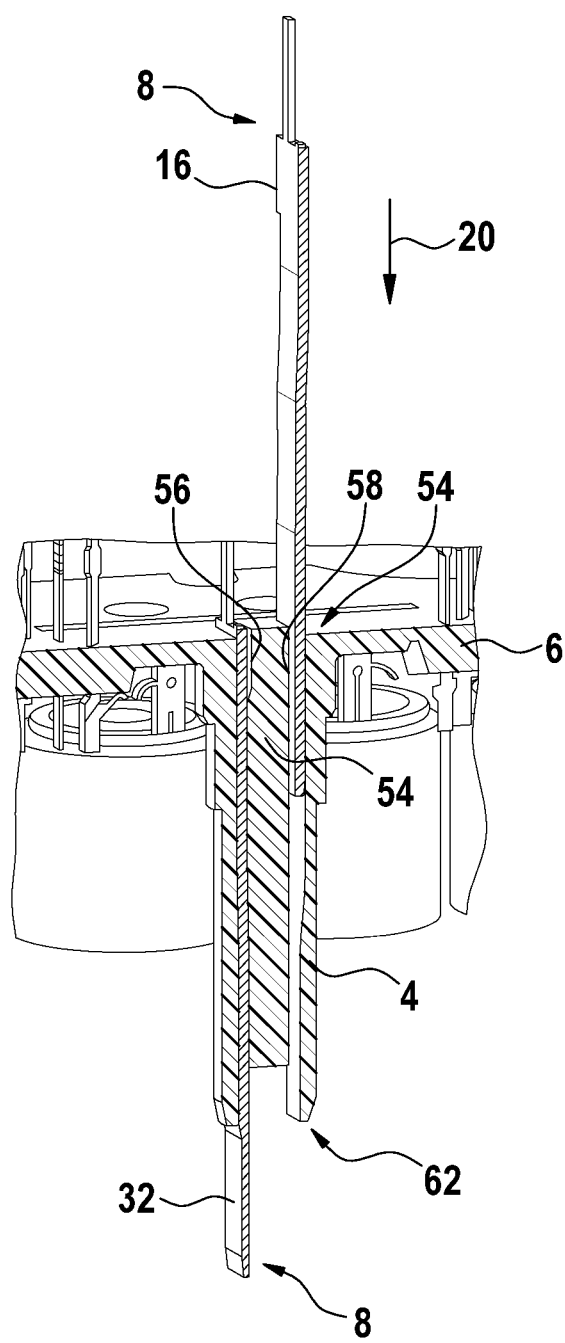

FIG. 9 shows the housing having two recesses 56, 58, which is known from FIG. 7. In this case, the electrical contact 8 depicted on the left side is already positioned in the end position thereof and is attached non-detachably to the housing 4 substantially with zero backlash. The contact piece 32 leaving the outlet region 62 in the direction of longitudinal extension 20 is depicted in a clearly visible manner. It can furthermore be seen that during assembly the electrical contact 8 is inserted in the direction of longitudinal extension 20 initially into the insertion region 54 of the housing 4.

The invention claimed is:

1. An electrohydraulic power unit for controlling, by open or closed loop, a brake pressure of a hydraulic vehicle brake system, comprising a hydraulic block, which has a hydraulic pump and on which an electric motor for driving the hydraulic pump is provided, an electronic control device, which is provided on a side of the hydraulic block opposite the electric motor, and at least one electrical contact (8), which electrically conductively connects the electric motor to the electronic control device, wherein the electrical contact (8) is accommodated in a rod-shaped isolator and wherein the rod-shaped isolator, together with the electrical contact (8) accommodated therein, is guided through a through-passage in the hydraulic block, said through-passage extending through the hydraulic block from the side of said hydraulic block on which the control device is provided to the side of said hydraulic block on which the electric motor is provided, characterized in that the rod-shaped isolator is designed as a housing (4) in which the electrical contact (8) can be inserted and secured substantially with zero backlash and non-detachably, wherein the electrical contact (8) is designed as a blade contact or pin contact, comprising a contact dome (12), a contact enlargement (16) and a contact piece (32), wherein the contact enlargement (16) is configured at a first end (14) of the contact dome (12) transversely to a direction of longitudinal extension (20) of said contact dome, (12) and wherein the contact piece (32) is configured at a second end (30) of said contact dome (12) opposite the first end (14) in the direction of longitudinal extension (20) of said contact dome (12), and further wherein the contact dome (12) is bent in a rounded S-shaped manner such that said contact dome (12) in the region of the contact enlargement (16) and said contact dome (12) in the region of the contact piece (32) extend parallel to each other.

2. The electrohydraulic power unit according to claim 1, characterized in that the electronic control device comprises a tray (6), wherein the tray (6) and the housing (4) are embodied as one piece.

3. The electrohydraulic power unit according to claim 1, characterized in that a narrow side (38) of the contact enlargement (16) extending in the direction of longitudinal extension (20) of the contact dome (12) is designed as a pine-tree profile (42) or a wave profile (46).

4. The electrohydraulic power unit according to claim 1, characterized in that the housing (4) comprises in the direction of longitudinal extension thereof an insertion region (54) at a first end (52), wherein the insertion region (54) has a pocket (22) and a recess (56, 58), wherein the pocket (22) comprises surfaces (24, 26) such that the contact enlargement (16) can be accommodated substantially with zero backlash in a predetermined position by means of the surfaces (24, 26), wherein the recess (56,58) is designed in such a manner that the contact dome (12) can be inserted into the housing (4) free of any bending or torsional force and said contact dome (12) is guided free of any bending or torsional force after assuming the predetermined position.

5. The electrohydraulic power unit according to claim 4, characterized in that the housing (4) comprises in the direction of longitudinal extension thereof an outlet region (62) at a second end (60) opposite the first end (52), said outlet region being constricted at least on one side by a wedge (66) such that the inserted electrical contact (8) is guided substantially with zero backlash transversely to the direction of longitudinal extension (20) of the electrical contact (8).

6. The electrohydraulic power unit according to claim 1, characterized in that a first (8) and a second bent electrical contact (8) are accommodated in a common housing (4), wherein the first ends (14) of the first (12) and a second contact dome (12) are arranged in an insertion region (54) and are spaced apart from one another at a first distance (A), wherein the second ends (30) of the first (12) and the second contact dome (12) are arranged in an outlet region (62) and are spaced apart from one another at a second distance (B) such that the second distance (B) is smaller than the first distance (A).

7. The electrohydraulic power unit according to claim 6, characterized in that a recess (56) of the first contact dome (12) and a recess (58) of the second contact dome (12), which faces the recess (56) of the first contact dome (12), are connected to one another and form a common recess (64), wherein the common recess (64) extends up to a wedge (66).

* * * * *